(12) United States Patent
Kobayashi et al.

(10) Patent No.: US 11,104,289 B2
(45) Date of Patent: Aug. 31, 2021

(54) AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 16/878,747

(22) Filed: May 20, 2020

(65) Prior Publication Data
US 2020/0369232 A1    Nov. 26, 2020

(30) Foreign Application Priority Data

May 21, 2019   (JP) .............................. JP2019-095477
Mar. 23, 2020  (JP) .............................. JP2020-051510

(51) Int. Cl.
| | | |
|---|---|---|
| *B60R 21/207* | (2006.01) | |
| *B60R 21/217* | (2011.01) | |
| *B60R 21/231* | (2011.01) | |
| *B60R 21/00*  | (2006.01) | |

(52) U.S. Cl.
CPC ........ *B60R 21/207* (2013.01); *B60R 21/2176* (2013.01); *B60R 21/23138* (2013.01); *B60R 2021/0006* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 6,966,576 B1 * | 11/2005 | Greenstein | ........ | B60R 21/23138 280/730.1 |
| 8,047,564 B2 * | 11/2011 | Kibat | .................. | B60R 21/2338 280/730.2 |
| 9,365,180 B2 * | 6/2016 | Acker | ............... | B60R 21/23138 |
| 10,351,092 B2 * | 7/2019 | Taguchi | ............ | B60R 21/23138 |
| 10,717,405 B2 * | 7/2020 | Marciniak | ............. | B60R 21/235 |
| 10,899,305 B2 * | 1/2021 | Gwon | .................. | B60R 21/231 |

(Continued)

FOREIGN PATENT DOCUMENTS

| | | | | |
|---|---|---|---|---|
| JP | 2010115947 A | | 5/2010 | |
| JP | 2020172232 A | * | 10/2020 | ....... B60R 21/23138 |

*Primary Examiner* — Faye M Fleming
(74) *Attorney, Agent, or Firm* — Harness, Dickey & Pierce, P.L.C.; Stephen T. Olson

(57) ABSTRACT

[Problem] To provide an airbag device capable of controlling flow of gas discharged from an inflator.
[Resolution Means] The airbag device is an airbag device that expands and deploys in a vehicle passenger compartment of a vehicle and restrains a passenger sitting in a first seat from a side, including: a cushion 41 provided with a horizontal portion 41*d* that deploys in a horizontal direction of the vehicle in an expanded and deployed state and a protruding portion 41*e* that deploys in an upward direction of the vehicle from a center portion of the horizontal portion 41*d;* a diffuser that is secured inside the cushion 41, that is open in the horizontal direction of the vehicle, closed in a downward direction of the vehicle, and partially or entirely closed in a direction toward the protruding portion; and an inflator 42 that is secured to the first seat, provided inside the diffuser, and that discharges gas for expansion and deployment.

20 Claims, 17 Drawing Sheets

(56) References Cited

U.S. PATENT DOCUMENTS

| | | | |
|---|---|---|---|
| 10,906,499 B2* | 2/2021 | Byun | B60R 21/207 |
| 2010/0295280 A1* | 11/2010 | Tomitaka | B60R 21/23138 |
| | | | 280/730.1 |
| 2019/0161053 A1* | 5/2019 | Gwon | B60R 21/231 |
| 2020/0254960 A1* | 8/2020 | Kobayashi | B60R 21/237 |

* cited by examiner

AIRBAG DEVICE

CROSS-REFERENCE TO RELATED APPLICATIONS

This application claims the benefit of Japan Patent Application No. 2019-095477 filed on May 21, 2019 and Japan Patent Application No. 2020-051510 filed on Mar. 23, 2020, the disclosures of which are herein incorporated by reference in their entirety.

TECHNICAL FIELD

The present invention relates to an airbag device.

BACKGROUND

Airbags are provided in recent vehicles. A side airbag apparatus is a safety apparatus which is operated in case of an emergency such as a vehicle collision and, for example, includes a bag shaped cushion. There are various types of airbags, depending on the installation site and application. For example, a front airbag is provided in a center of a steering wheel to protect a driver from a collision in a front-back direction. Furthermore, a curtain airbag that expands and deploys along a side window from the roof in the vicinity of a wall portion, a side airbag that expands and deploys to an immediate side of the passenger from a side portion of a seat, and the like, are provided in order to protect a passenger from a side collision or a subsequent rollover.

Furthermore, some side airbags suppress a passenger sitting in a driver's seat from moving to a front-passenger seat side in the event of a side collision or the like (Patent Document 1).

RELATED ART DOCUMENTS

Patent Documents

Patent Document 1: Japanese Unexamined Patent Application Publication No. 2010-115947

SUMMARY OF THE INVENTION

Problem to be Solved by the Invention

An inflator that rapidly discharges gas when an impact or the like occurs is disposed inside an airbag. The airbag is expanded and deployed by the gas discharged from the inflator. However, depending on vehicle size, location where the airbag is attached, and shape of the airbag, expansion and deployment may not sufficiently protect a passenger from an impact.

An object of one aspect of the present invention is to provide an airbag device capable of sufficiently protecting a passenger.

Means for Solving the Problem

The airbag device is an airbag device that expands and deploys in a vehicle passenger compartment of a vehicle and restrains a passenger sitting in a first seat from a side direction, containing: a cushion provided with a horizontal portion that deploys in a horizontal direction of the vehicle in an expanded and deployed state and a protruding portion that deploys in an upward direction of the vehicle from a center portion of the horizontal portion; a diffuser that is secured inside the cushion that is open in the horizontal direction of the vehicle, closed in a downward direction of the vehicle, and partially or entirely closed in a direction toward the protruding portion; and an inflator provided inside the diffuser, that is secured to the first seat, and that discharges gas for expansion and deployment.

In this airbag device, the gas discharged from the inflator flows out into the cushion through the diffuser. The dimensions and shape of the opening of the diffuser are appropriately set to prevent the protruding portion from deploying too rapidly. The entire cushion is deployed in an appropriate manner, such that the airbag device can sufficiently protect the passenger.

The diffuser of the airbag device at least partially opens in the horizontal direction of the vehicle.

The diffuser of the airbag device has a tubular shape that is open over an entire length at both ends in the horizontal direction of the vehicle, and closed over the entire length in the upward direction and downward direction of the vehicle.

The diffuser of the airbag device has a bag shape with openings through which the gas that was injected from the inflator can be injected in the horizontal direction of the vehicle.

The diffuser of the airbag device has a bag shape that is open over a portion or an entire length of a first end in the horizontal direction of the vehicle, closed over the entire length of a second end in the horizontal direction of the vehicle, and closed over the entire length in the upward direction and downward direction of the vehicle.

In this airbag device, the cushion first deploys in the horizontal direction at high speed. Therefore, a portion from the abdomen to the chest of a seated passenger can be quickly restrained and protected.

The diffuser of the airbag device opens at three points on both ends of the vehicle in the upward direction and horizontal direction.

In this airbag device, the cushion deploys in both horizontal and vertical directions in a well-balanced manner. Therefore, the upper body of the seated passenger can be appropriately restrained and protected.

The cushion of the airbag device has an insertion hole through which a stud bolt that secures the inflator to a structure in the vehicle passenger compartment is inserted.

In this airbag device, the inflator can be firmly secured to a skeleton frame by a stud bolt.

Effects of the Invention

One aspect of the present invention can provide an airbag device capable of sufficiently protecting a passenger.

DESCRIPTION OF THE PREFERRED EMBODIMENT

Embodiments of the present invention will be described below with reference to the drawings. In addition, the "upper", "lower", and "vertical" directions of the vehicle used in the descriptions below indicate directions on a line connecting the center of the roof of the vehicle to the center of the floor of the vehicle, where the direction toward the roof is "upper" and the direction toward the floor is "lower". Further, the "front", "back", and "longitudinal" directions of the vehicle refer to the forward direction of the vehicle as the "front" direction and the rearward direction of the vehicle as the "back" direction. Further, the horizontal direction of the vehicle is a direction in which ordinary seats are arranged side by side, and is a direction orthogonal to the "longitudinal" direction described above. The seat opposite to the driver seat refers to the passenger seat. The seat opposite to the passenger seat refers to the driver seat. In other words, when describing a seat and a seat opposite to that seat, if the seat is a driver seat, the opposite seat is a passenger seat. On the other hand, when the seat is the passenger seat, the opposite seat is the driver seat.

Embodiment 1

Figure 1:
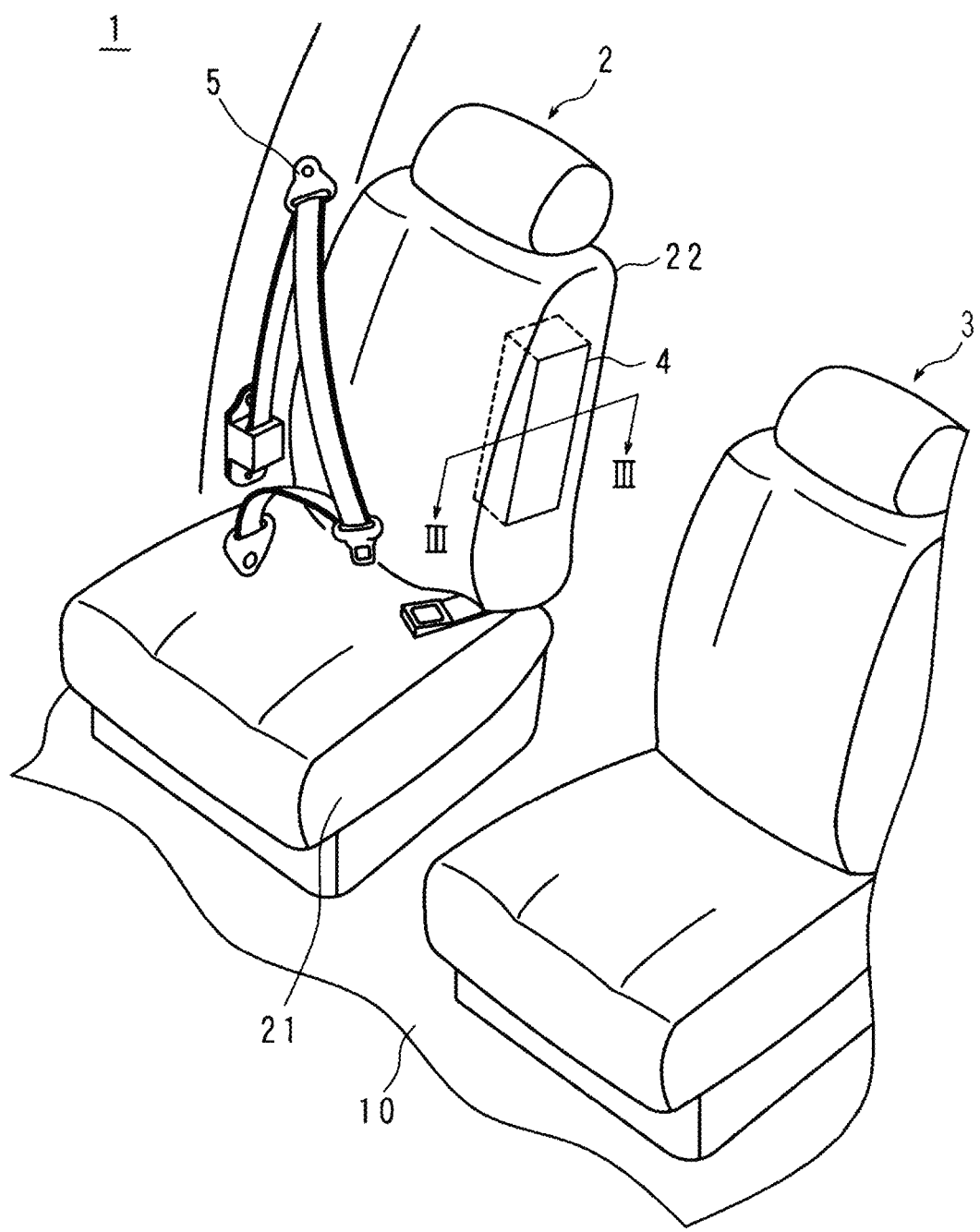
FIG. 1 is a perspective view schematically illustrating an interior of a vehicle provided with an airbag device according to embodiment 1.
Figure 2:
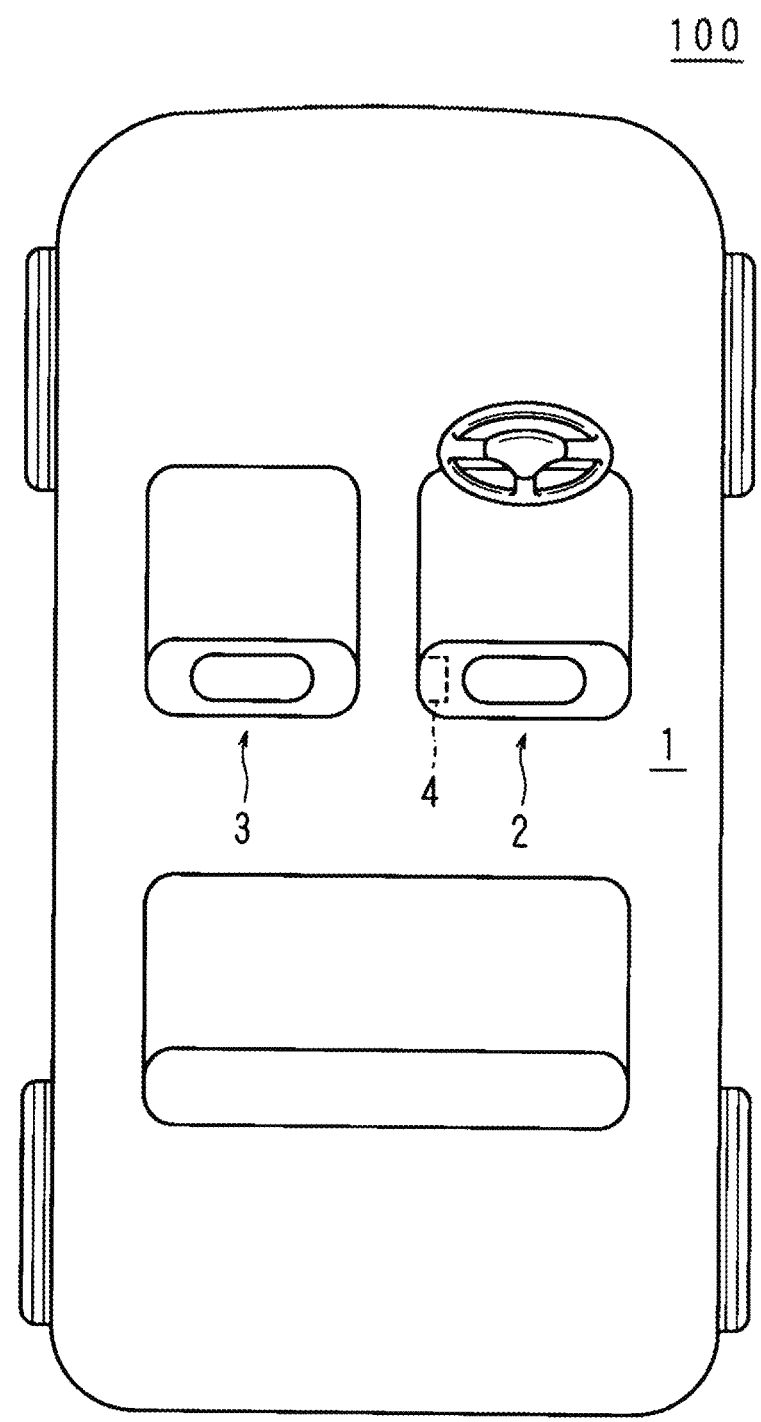
FIG. 2 is a plan view schematically illustrating the interior of the vehicle provided with the airbag device according to embodiment 1.

FIG. 1 is a perspective view schematically illustrating the inside of a vehicle having an airbag device 4 according to embodiment 1. The airbag device 4 of the present embodiment is a side airbag device. FIG. 2 is a plan view schematically illustrating the inside of the vehicle having the airbag device 4 according to embodiment 1. FIG. 1 and FIG. 2 illustrate a first seat (driver seat) 2 installed on a floor 10 of a passenger compartment 1, a second seat (passenger seat) 3 adjacent to the first seat, and a seat belt 5. The driver seat 2 includes a seat portion 21 and a backrest 22 that rises upward from the rear side of the seat portion 21.

As illustrated in FIG. 2, the airbag device 4 according to embodiment 1 is arranged on the inner side surface of the backrest 22 of the driver seat 2 installed in the passenger compartment 1 of a vehicle 100 on the side of the passenger seat 3.

Figure 3:
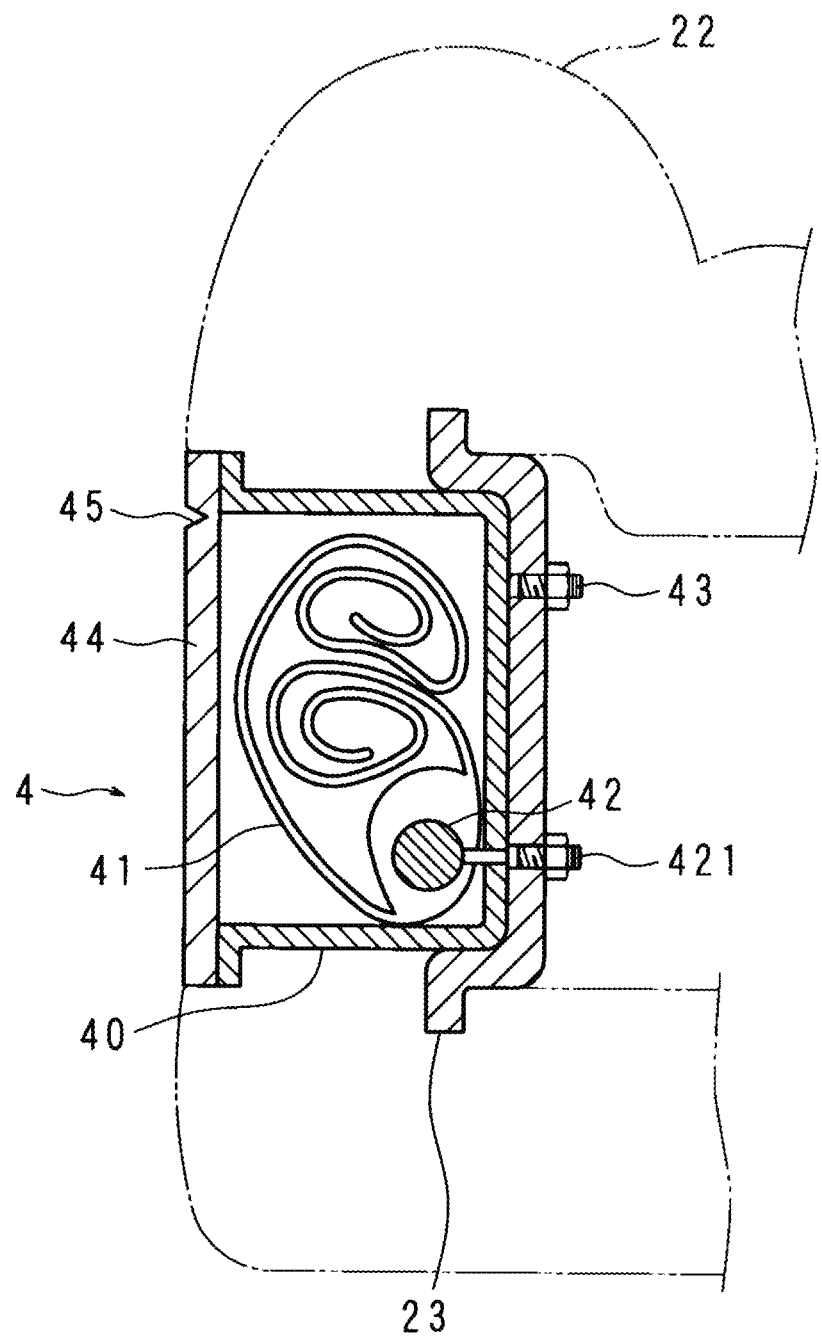
FIG. 3 is a cross-sectional view of the airbag device along line III-III in FIG. 1.

FIG. 3 is a cross-sectional view of the airbag device 4 along line III-III in FIG. 1. The top and bottom of the diagram correspond to the front and the rear of the vehicle 100. The airbag device 4 includes a cushion 41 and an inflator 42 stored in a housing portion 40.

The cushion 41 is, for example, a bag made of cloth reinforced by braiding high-strength fibers such as nylon fiber and the like, and is folded into a roll shape and stored inside the housing portion 40. The shape and folding method of the cushion 41 will be described below. The inflator 42 is inserted in the bottom plate of the housing portion 40 with stud bolts 421, and is fixed on a skeleton frame 23 of the backrest 22. The skeleton frame 23 is an example of a structure provided in the passenger compartment 1. The inflator 42 is stored inside the cushion 41 so as to be able to inject gas for expansion and deployment.

The housing portion 40 is a box body with one surface opened, fixed to the skeleton frame 23 of the backrest 22 by stud bolt 43 and stud bolt 421 as described above. The opening of the housing portion 40 faces the side of the passenger seat 3 and is covered with a cover plate 44 that is flush with the side surface of the driver seat 2. The cover plate 44 is a plate made of resin having a lower strength than the housing portion 40. A tear seam 45 is formed in the front portion of the cover plate 44 over the entire length in the vertical direction. During a collision of the vehicle 100, the cushion 41 deploys due to the gas injecting action of the inflator 42, breaks the tear seam 45, and deploys laterally. The tear seam 45 illustrated in FIG. 3 is formed on the outer surface of the cover plate 44, but can also be formed on the inner surface of the cover plate 44.

Figure 4:
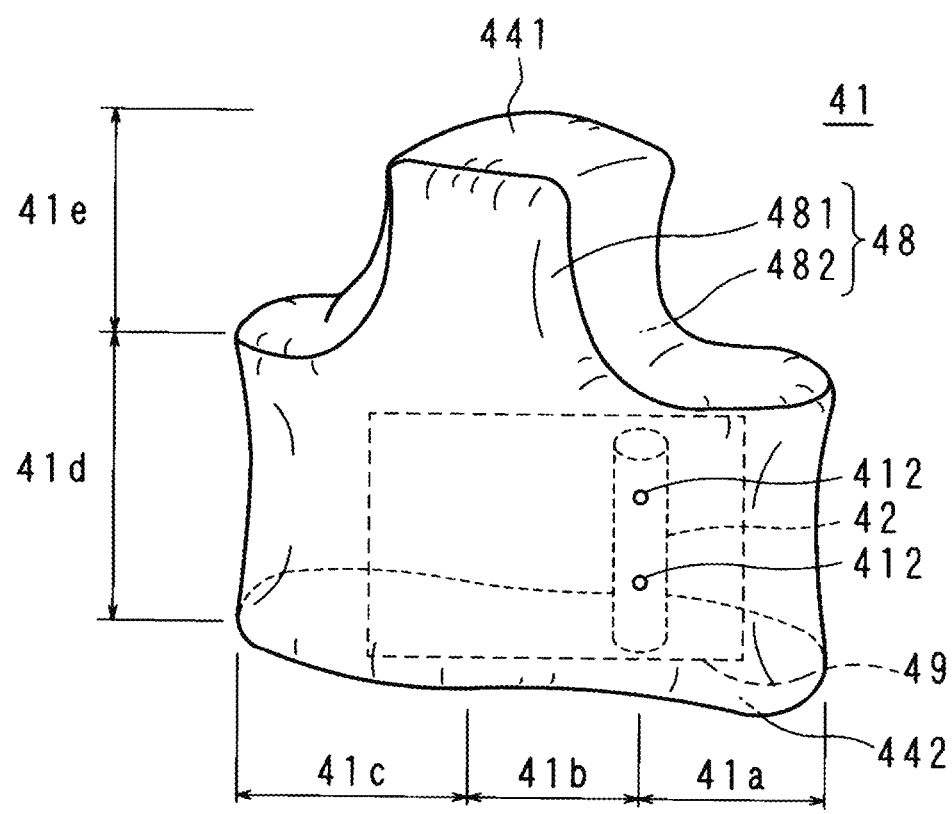
FIG. 4 is a perspective view illustrating an example of a cushion.

FIG. 4 is a perspective view illustrating an example of the cushion 41. FIG. 4 illustrates the cushion 41 when expanded. The cushion 41 has a horizontal portion 41d that deploys in the horizontal direction of the vehicle 100, and a protruding portion 41e that deploys in the upward direction of the vehicle 100 from the central portion of the horizontal portion 41d.

The cushion 41 is formed by joining two panels 48, a first panel 481 and a second panel 482, each having a convex shape in a plan view, through a gusset portion that is thick in the vehicle width direction. The gusset portion includes a first gusset portion 441 that joins the upper portion of the panels 48 and a second gusset portion 442 that joins the lower portion of the panels 48.

A rectifying sheet 49 is attached to the inner surface of the first panel 481. Details of the rectifying sheet 49 will be described below. A cylinder type inflator 42 is arranged between the first panel 481 and the rectifying sheet 49. The first panel 481 and the rectifying sheet 49 form a diffuser 491 (see FIG. 9) that adjusts the flow of gas discharged from the inflator 42.

The first panel 481 is provided with an insertion hole 412 into which the stud bolt 421 is inserted. Although FIG. 4 illustrates a case where there are two insertion holes 412, the number of the insertion holes 412 can be one or three or more.

The inflator 42 operates in an emergency such as a collision of the vehicle 100, and discharges gas into the cushion 41. The cushion 41 explosively expands due to the action of the injection gas of the inflator 42. The expansion pressure of the cushion 41 acts on the cover plate 44 with the bottom plate of the housing portion 40 as a support. The cushion 41 breaks the tear seam 45 and expands and deploys to the outside of the housing portion 40. Note that, hereinafter, expansion and deployment can also be referred to simply as deployment.

In the description below, the horizontal portion 41d of the cushion 41 is conceptually made of three parts. In a position where the inflator 42 is arranged as a boundary, the portion mainly expanding and deploying on the first seat (driver seat) is the first portion 41a, the lower portion of the protruding portion 41e that mainly protrudes upward, extending in the direction of the second seat (passenger seat) on the opposite side as the inflator 42 is the second portion 41b, and the portion that further extends towards the second seat (passenger seat) from the second portion 41b is the third portion 41c. The first portion 41a, the second portion 41b, and the third portion 41c are conceptual divisions. The boundary between the first portion 41a and the second portion 41b and the boundary between the second portion 41b and the third portion 41c are not precise.

Figure 5:
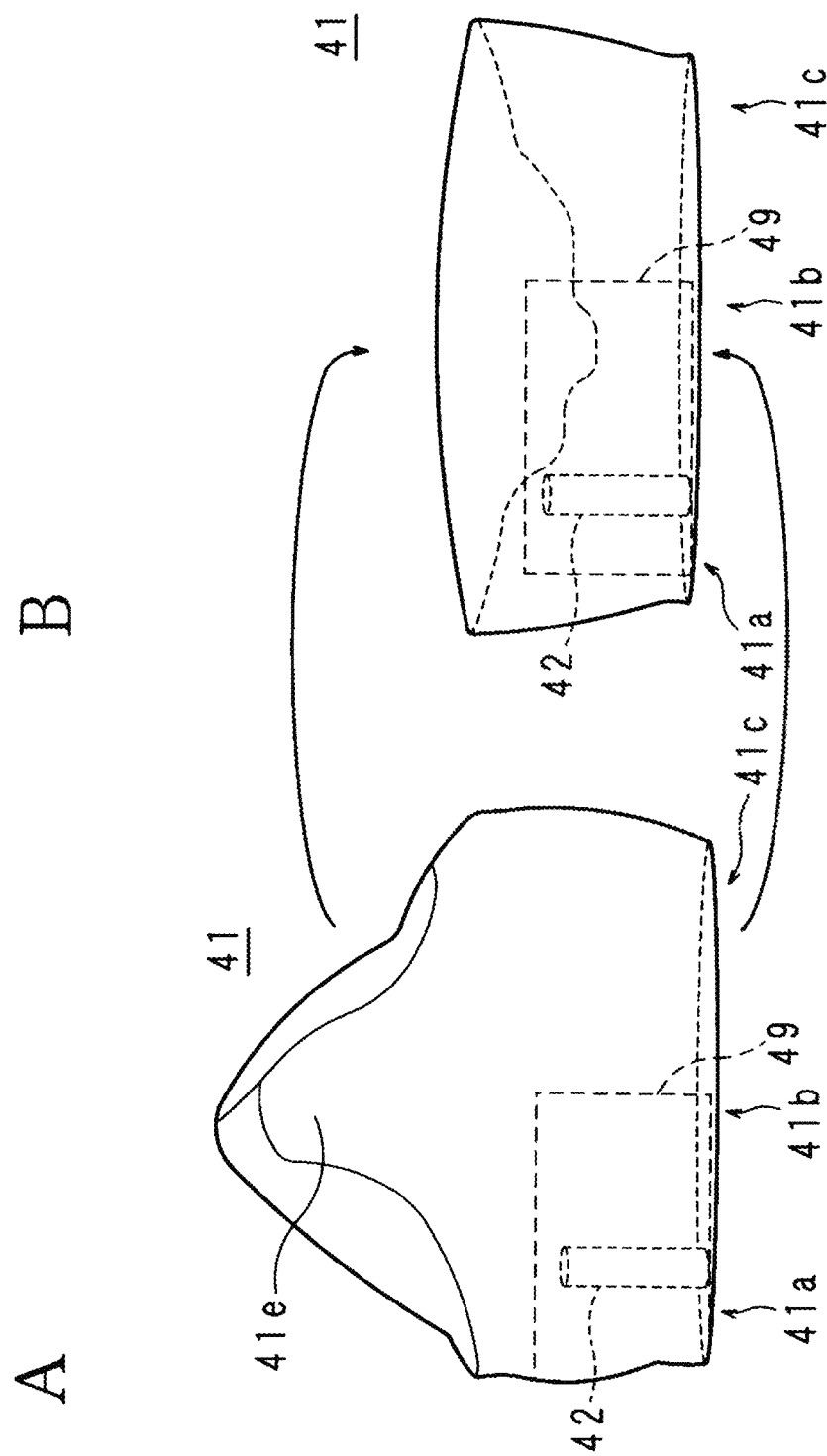
FIG. 5 is an explanatory view illustrating a method of folding the cushion.
Figure 6:
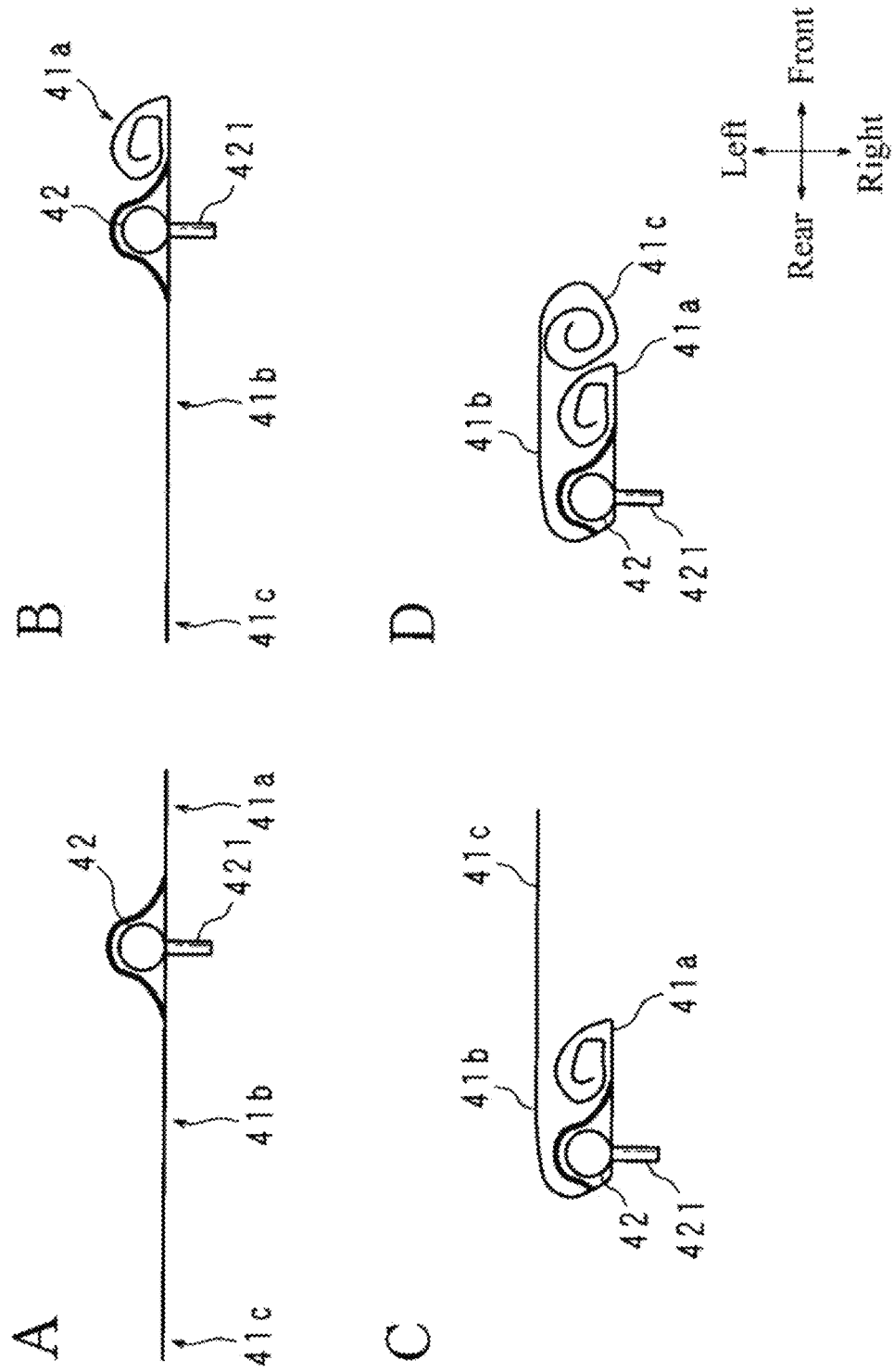
FIG. 6 is an explanatory view illustrating a method of folding the cushion.

FIG. 5 and FIG. 6 are descriptive diagrams illustrating a method of folding the cushion 41. FIG. 5 illustrates a method of folding the cushion 41 into a flat plate shape. As illustrated in FIG. 5, the convex portion of the convex protruding portion 41e is folded inside the cushion 41. Alternatively, the convex portion can be folded in the front and back direction of the diagram. Similar to the convex portion, the bottom portion of the cushion 41 is folded inward or folded in the front and back direction of the diagram. The cushion 41 changes from the state of FIG. 5A to the state of FIG. 5B.

FIG. 6 illustrates a folding method for storing the cushion 41. In FIG. 6, illustration of the rectifying sheet 49 is omitted. FIG. 6 is a plan view of the cushion 41 folded in a flat plate shape as viewed from above with the cushion 41 in an upright state. As described above, the inflator 42 is stored between the first panel 481 and the rectifying sheet 49. As illustrated in FIG. 6B, the first portion 41a of the cushion 41 is folded into a roll shape. The fold shall be made into a clockwise direction when viewed from above. Hereinafter, such a folding method is referred to as "clockwise roll folding". As illustrated in FIG. 6C, the second portion 41b is folded back from the rear side to the front side. The left side of the folded first portion 41a is covered by the second portion 41b. As illustrated in FIG. 6D, the third portion 41c is folded in a roll shape. The fold shall be made in a counterclockwise direction. Hereinafter, such a folding method is referred to as "counterclockwise roll folding". As illustrated in FIG. 6D, the folded cushion 41 is in a state in which the first portion 41a is interposed between the third portion 41c and the inflator 42. As illustrated in FIG. 3, the folded cushion 41 is stored in the side surface portion of the backrest 22 of the seat such that the third portion 41c is on the side to the front of the vehicle and the inflator 42 is on the side to the back of the vehicle. The cushion 41 is fixed to the housing portion 40 by stud bolts 421 provided on the inflator 42. Furthermore, the cover plate 44 covers the cushion 41 and the housing portion 40.

Figure 7:
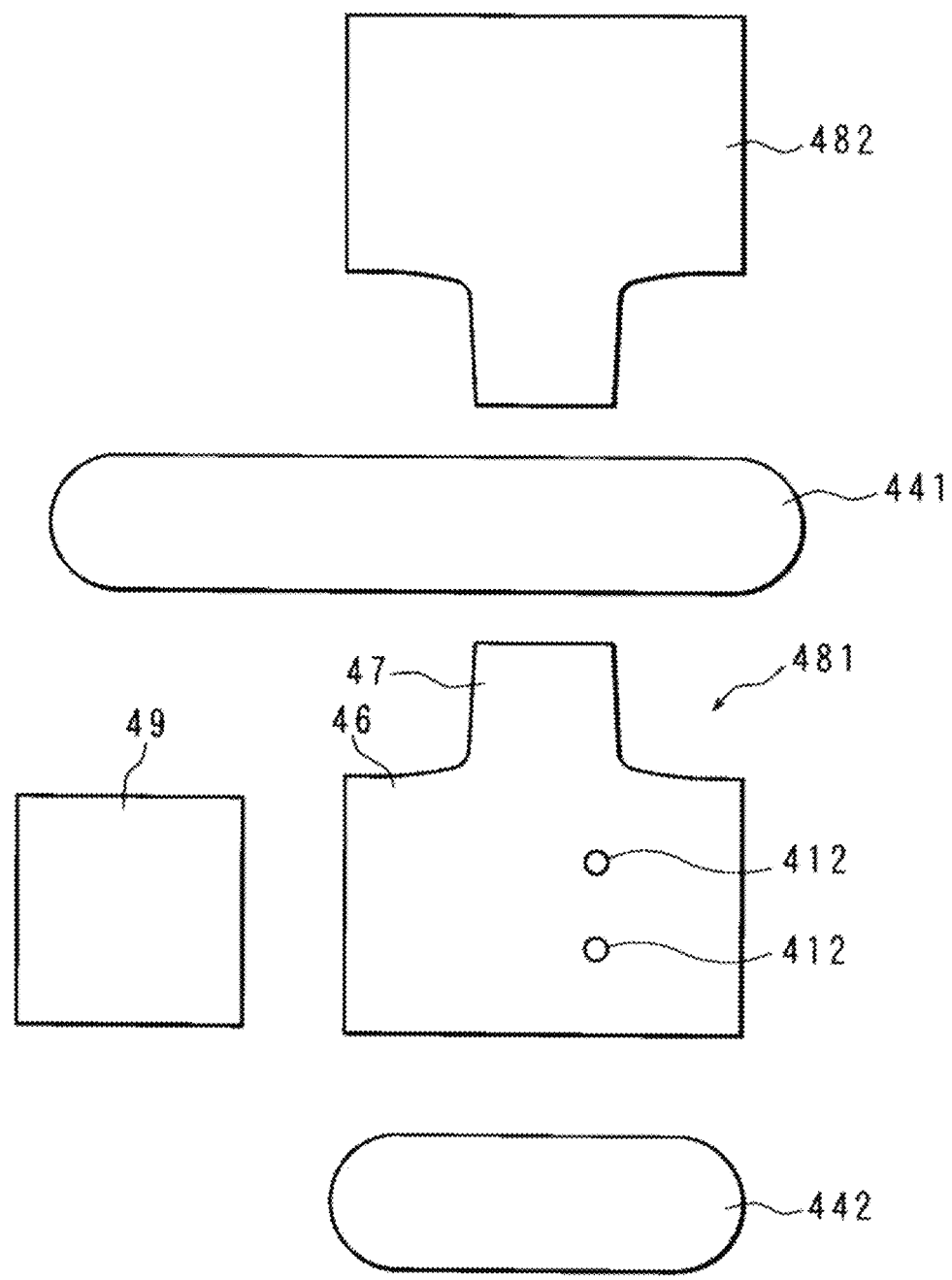
FIG. 7 is an explanatory diagram for describing a configuration of the cushion.

FIG. 7 is a descriptive diagram illustrating the configuration of the cushion 41. In FIG. 7, the first panel 481, the second panel 482, the rectifying sheet 49, the first gusset portion 441, and the second gusset portion 442, none of which are yet to be combined, are each illustrated in simplified form from the surface side of the cushion 41.

The first panel 481 includes a substantially rectangular-shaped horizontal formed portion 46, and a substantially rectangular-shaped protruding formed portion 47 protruding from the central portion of the long side of the horizontal formed portion 46. The first panel 481 is provided with two insertion holes 412 arranged in the short side direction of the horizontal formed portion 46. The rectifying sheet 49 has a rectangular shape. The second panel 482 has the shape of the first panel 481 turned upside down.

The first gusset portion 441 and the second gusset portion 442 have an oval shape.

The rectifying sheet 49 is attached to the back surface of the first panel 481, which is described below. The short sides of the horizontal formed portion 46 are joined to the corresponding sides of the second panel 482. The long side of the horizontal formed portion 46, the edge of the protruding formed portion 47 contiguous to the long side, and the corresponding side of the second panel 482 are joined to the first gusset portion 441. One long side of the horizontal formed portion 46 and the corresponding side of the second panel 482 are joined to the second gusset portion 442. As described above, the first panel 481, the second panel 482, the first gusset portion 441, and the second gusset portion 442 are joined in a bag shape. Each seam can be made by any joining method such as sewing, gluing, welding, and the like.

Note that the structure of the cushion 41 described with reference to FIG. 7 is one example. The plurality of members illustrated in FIG. 7 can be one continuous member. One member illustrated in FIG. 7 can be divided into a plurality of members. The shape of the first panel 481 and the shape of the second panel 482 can be different.

Figure 8:
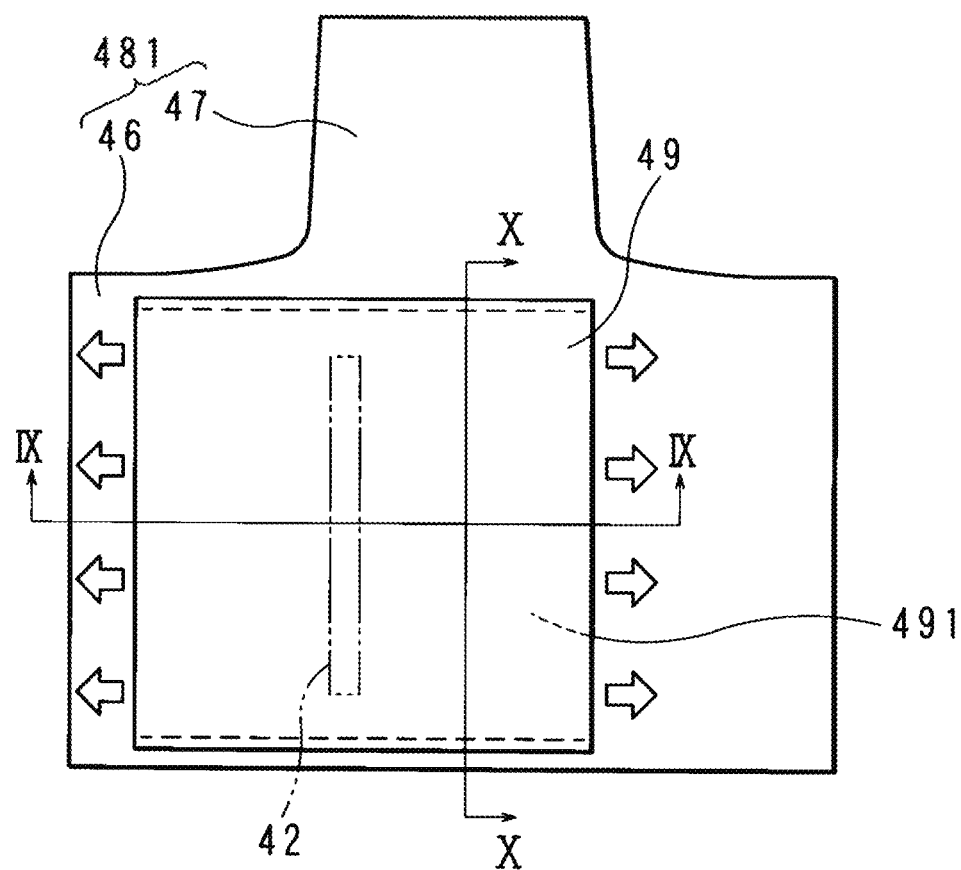
FIG. 8 is an explanatory diagram for describing a method of joining a first panel and a rectifying sheet.

FIG. 8 is a descriptive diagram illustrating a method of joining the first panel 481 and the rectifying sheet 49. FIG. 8 is a view of the first panel 481 as viewed from the inside. A rectifying sheet 49 is overlaid on the horizontal formed portion 46, aligning the orientation of the sides thereof. A thick broken line at the edge of the rectifying sheet 49 signifies a portion where the rectifying sheet 49 is fixed to the first panel 481 by using an arbitrary fixing means such as sewing, or the like. The rectifying sheet 49 is fixed to the first panel 481 along two sides parallel to the long side of the horizontal formed portion 46.

Figure 9:
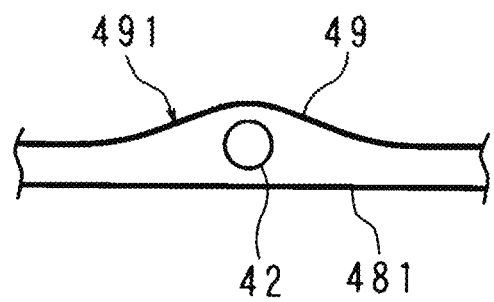
FIG. 9 is a cross-sectional view of a condition where an inflator is disposed, along line IX-IX in FIG. 8.
Figure 10:
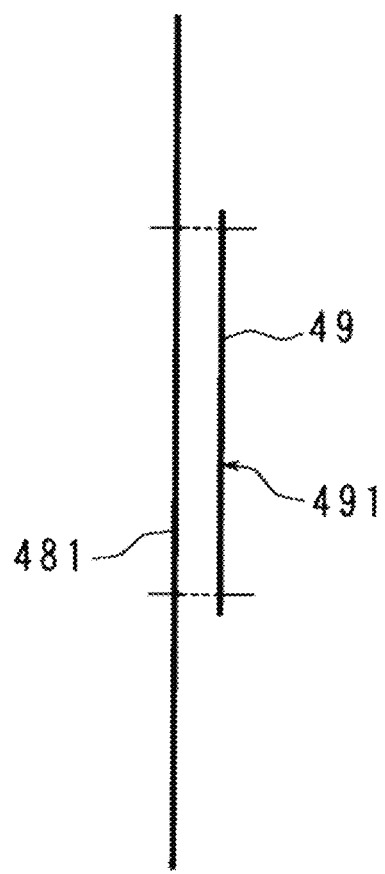
FIG. 10 is a cross-sectional view along line X-X in FIG. 8.

The inflator 42 indicated by the two-dot dashed line is provided between the first panel 481 and the rectifying sheet 49. FIG. 9 is a cross-sectional view along line IX-IX of FIG. 8 illustrating the diffuser 491 with the inflator 42. The inflator 42 is interposed between the first panel 481 and the rectifying sheet 49. FIG. 10 is a cross-sectional view along line X-X of FIG. 8. The rectifying sheet 49 is fixed to the first panel 481 at the edge.

As described above, the rectifying sheet 49 and the first panel 481 form the diffuser 491 inside the cushion 41. The diffuser 491 of the present embodiment has a tubular shape that is open across the entire length on both ends in the horizontal direction of the vehicle 100 and is closed over the entire length in the upward and downward directions of the vehicle 100. The diffuser 491 of the present embodiment covers the space between the protrusion 41e of the cushion 41 and the inflator 42.

The thick arrow in FIG. 8 indicates the flow of gas flowing out of the diffuser 491. The diffuser 491 is open at both ends in the left-right direction over the entire length in the vertical direction. The gas flowing out from the diffuser 491 fills the entire interior of the cushion 41, including the space between the diffuser 491 and the second panel 482. In other words, the cushion 41 is deployed by the gas flowing out from the diffuser 491.

Figure 11:
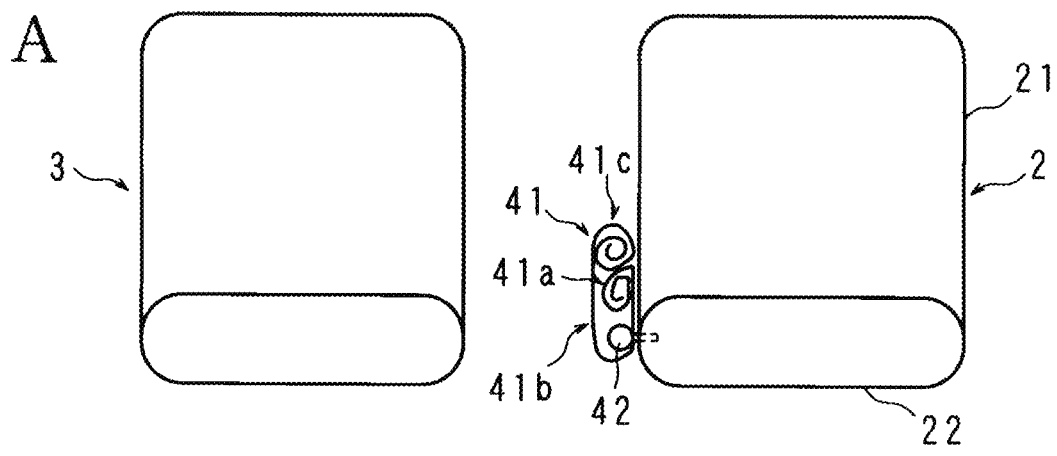
FIG. 11 is an explanatory diagram illustrating a process of deploying the cushion.
Figure 11:
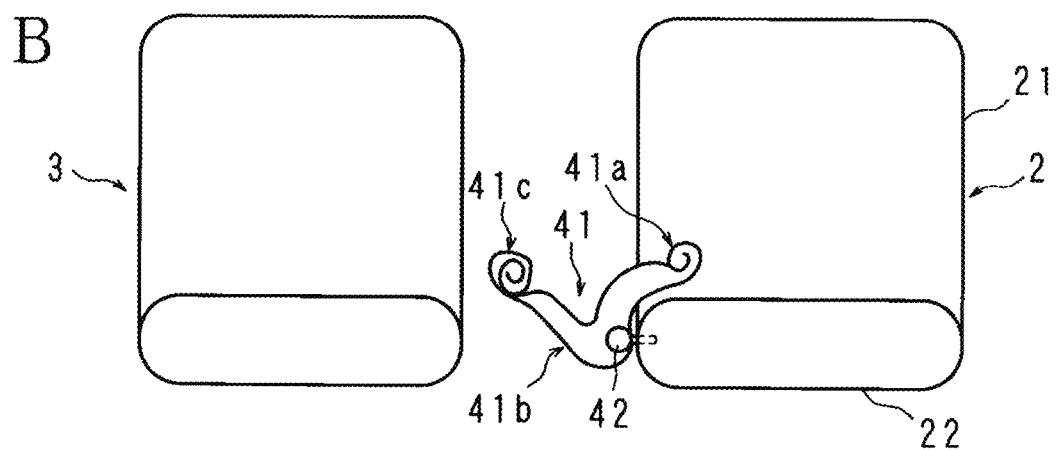
Figure 11:
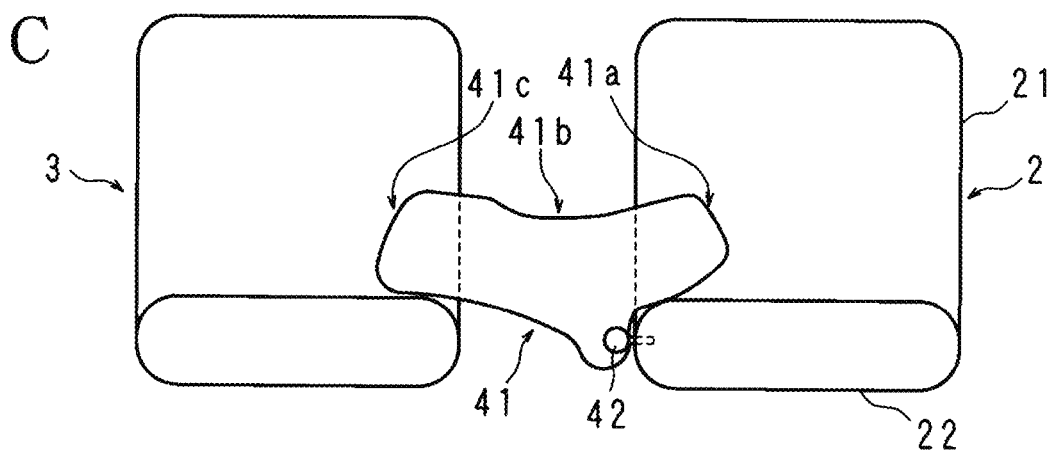

FIG. 11 is a descriptive diagram illustrating the deployment process of the cushion 41. FIG. 11 is a view seen from above the passenger compartment 1. FIG. 11A illustrates the state before deployment. FIG. 11B illustrates the state after the start of deployment. After the start of the deployment, the first portion 41a is roll folded in the clockwise direction when viewed from above the passenger compartment 1, and therefore the third portion 41c is pushed out to the left front when deploying. The force exerted by the first portion 41a becomes a force that directs the third portion 41c toward the passenger seat 3 direction. The third portion 41c is roll folded counterclockwise as viewed from above the passenger compartment 1, such that deployment occurs inclined in the direction of the passenger seat 3 due to the force of deployment from the folded state, together with the force of the first portion 41a. On the other hand, the second portion 41b deploys while inclined in the direction of the passenger seat 3, or in other words the horizontal direction, due to the force of deployment by the gas from the inflator 42. On the other hand, the first portion 41a is roll folded in the clockwise direction, so as to deploy while inclined toward the right side of the passenger compartment 1 due to the force of deployment from a state of being folded. Therefore, as illustrated in FIG. 11B, the state of the cushion 41 is V-shaped in plan view.

Figure 12:
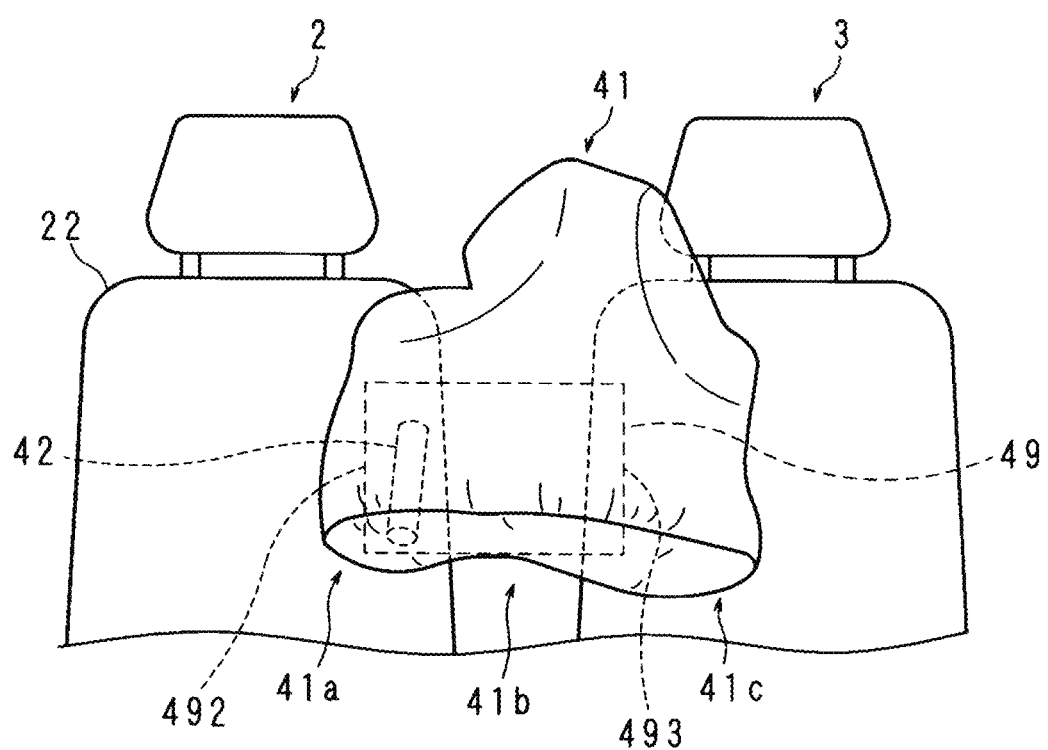
FIG. 12 is a front surface view illustrating a condition where the cushion is deployed.

FIG. 11C illustrates a state where the cushion 41 is deployed. FIG. 12 is a front view illustrating a state where the cushion 41 is deployed. FIG. 12 is a view seen from the front of the passenger compartment 1. As illustrated in FIG. 11C and FIG. 12, when the cushion 41 is in a deployed state, the third portion 41c is in a state that rides up on the passenger seat 3. Therefore, it is possible to restrain the passenger seated in the driver seat 2 from moving to the passenger seat 3 side. Furthermore, the impact force of the collision received by the passenger can be mitigated by the restraint position of the cushion 41 being fixed, in addition to using the reaction force from the seat of the passenger seat 3.

As illustrated by a broken line in FIG. 12, the rectifying sheet 49 has a first end portion 492 in the horizontal direction that is arranged on the driver seat 2 in a state where the cushion 41 is deployed, and a second end portion 493 has a horizontal length that can reach the passenger seat 3. Therefore, the open portion of the diffuser 491 formed at the end portion of the rectifying sheet 49 in the horizontal direction also extends to the passenger seat 3 when the cushion 41 is deployed.

With the present embodiment, during the process of deploying the cushion 41, the gas released from the inflator 42 passes through the portion where the rectifying sheet 49 is not fixed to the first panel 481. The diffuser 491 inhibits the gas discharged from the inflator 42 from directly going into the protrusion 41e of the cushion 41.

Therefore, the deployment of the portion that protrudes in the upward direction of the vehicle 100 is slightly delayed compared to the deployment in the direction of passenger seat 3. Therefore, even if the passenger seated in the front passenger seat 3 is OOP (Out Of Position: irregular seating posture), the head of the passenger can be prevented from being injured by a strong interference with the cushion 41 during deployment. Thereby, it is possible to provide an airbag device 4 that exhibits favorable results when evaluated for the degree of protection of a passenger who is in an irregular seating posture, or in other words, an OOP test.

The gas released from the inflator 42 causes the cushion 41 to first deploy in the horizontal direction at high speed. Therefore, the portion from the abdomen to the chest of the passenger sitting on the driver seat 2 or the passenger seat 3 can be promptly restrained and protected.

With the present embodiment, the rectifying sheet 49 is fixed along the entire length of both long sides of the first panel 481, and therefore the rectifying sheet 49 does not shift when the cushion 41 is folded. Therefore, it is possible to provide an airbag device 4 with a cushion 41 that easily folds into a prescribed shape.

With the present embodiment, the gas emitted from the inflator 42 is rectified by the diffuser 491 and deploys the cushion 41. The gas emitted from the inflator 42 does not directly impinge except for the portion forming the inner surface of the diffuser 491. Therefore, it is possible to provide an airbag device 4 in which the cushion 41 has high durability, or in other words, the cushion 41 is less likely to be damaged by the gas emitted from the inflator 42.

The folding method of the cushion 41 described with reference to FIG. 6 is only one example. One or both of the first portion 41a and the third portion 41c can be folded in the shape of a bellows, or in other words, accordion folding. One or both of the first portion 41a and the third portion 41c can be rolled in the opposite direction to that of FIG. 6.

The selection of the folding method of the cushion 41, the length of the first portion 41a, the second portion 41b, and the third portion 41c of the cushion 41 (the length in the longitudinal direction as illustrated in FIG. 4) and the ratio of each length are appropriately designed for each vehicle. The height of the horizontal portion 41d, the height of the protruding portion 41e, the position of the protruding portion 41e, and the horizontal length of the protruding portion 41e are appropriately designed for each vehicle. Furthermore, the height that the airbag device 4 should be installed from the floor 10 is also a matter of appropriate design for each vehicle.

Although a form in which the airbag device 4 was provided in the driver seat 2 is illustrated, the airbag can also be provided in the passenger seat 3. In this case, the airbag device 4 installed in the driver seat 2 and the airbag device 4 installed in the passenger seat 3 shall have a mirror-symmetrical structure. In this embodiment 1, the airbag device 4 has been described as being stored in the housing portion 40, however, it is also possible for the airbag device 4 to be directly attached and fixed to the skeleton frame 23 of the backrest 22 without the presence of the housing portion. In this case, a tear seam can be provided in the seat pad portion of the backrest 22, and the inflating cushion 41 can be deployed so as to push the seat pad away.

Embodiment 2

The present embodiment relates to an airbag device 4 in which the rectifying sheet 49 is fixed to the first panel 481 on three sides. Descriptions of parts common to embodiment 1 will be omitted.

Figure 13:
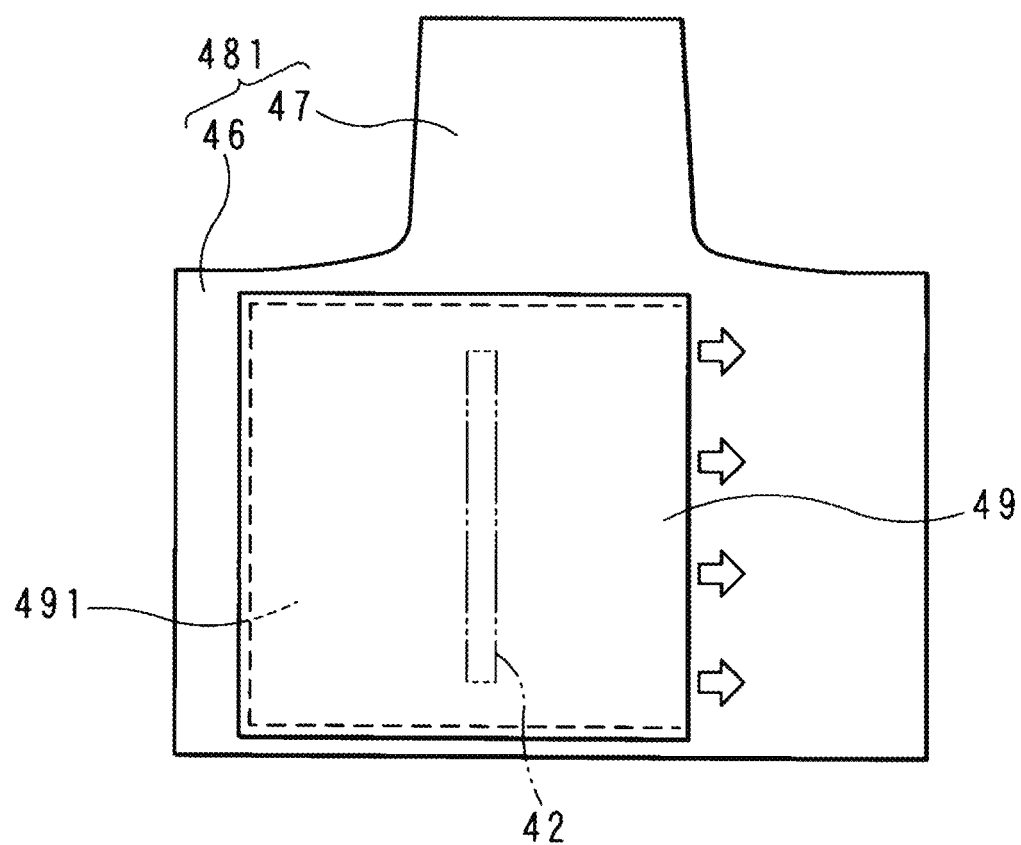
FIG. 13 is an explanatory diagram for describing a method of joining a first panel and rectifying sheet according to embodiment 2.

FIG. 13 is an explanatory diagram illustrating a method of joining the first panel 481 and the rectifying sheet 49 in embodiment 2. The rectifying sheet 49 is fixed to the first panel 481 along a total of three sides including two sides parallel to the long side of the horizontal formed portion 46 and one side close to the short side of the horizontal formed portion 46. In other words, the rectifying sheet 49 and the first panel 481 are open along the entire length in the vertical direction of the vehicle 100 at one end in the horizontal direction and closed along the entire length in the vertical direction at the other end in the horizontal direction, thus forming a bag-shaped diffuser 491 that is closed along the entire length in the upward direction and the downward direction of the vehicle 100.

With the present embodiment, the diffuser 491 inhibits the gas released from the inflator 42 from directly impinging on the protruding portion 41e of the cushion 41 in the process of deploying the cushion 41.

With the present embodiment, during the process of deploying the cushion 41, the gas released from the inflator 42 causes the passenger seat 3 side to deploy first. The portion on the driver seat 2 side and the upper portion of the cushion 41 are deployed while the portion on the passenger seat 3 side of the cushion 41 is in contact with the passenger and the seat. Deploying the passenger seat side that is relatively farther from the airbag device 4 first makes possible an airbag device 4 that can promptly protect the passenger seated in the passenger seat 3 and also appropriately protect the passenger seated in the driver seat 2.

Note that the rectifying sheet 49 can be fixed to the first panel 481 along a total of three sides, two sides parallel to the long side of the horizontal formed portion 46 and one side separated from the short side of the horizontal formed portion 46. In such a case, the gas released from the inflator 42 causes the driver seat 2 side to first open in the process of deploying the cushion 41. With the portion of the cushion 41 on the passenger seat side in contact with the passenger and the seat, the portion that is on the passenger seat 3 side and higher is deployed. This enables an airbag device 4 with a reproducible deployment state for the cushion 41 on the side of the driver seat 2 to be provided, regardless of whether or not there is a passenger seated in the passenger seat 3.

Embodiment 3

The present embodiment relates to an airbag device 4 in which the rectifying sheet 49 is fixed to the first panel 481 on the upper and lower two sides and a portion of the remaining one side. Descriptions of parts common to embodiment 1 will be omitted.

Figure 14:
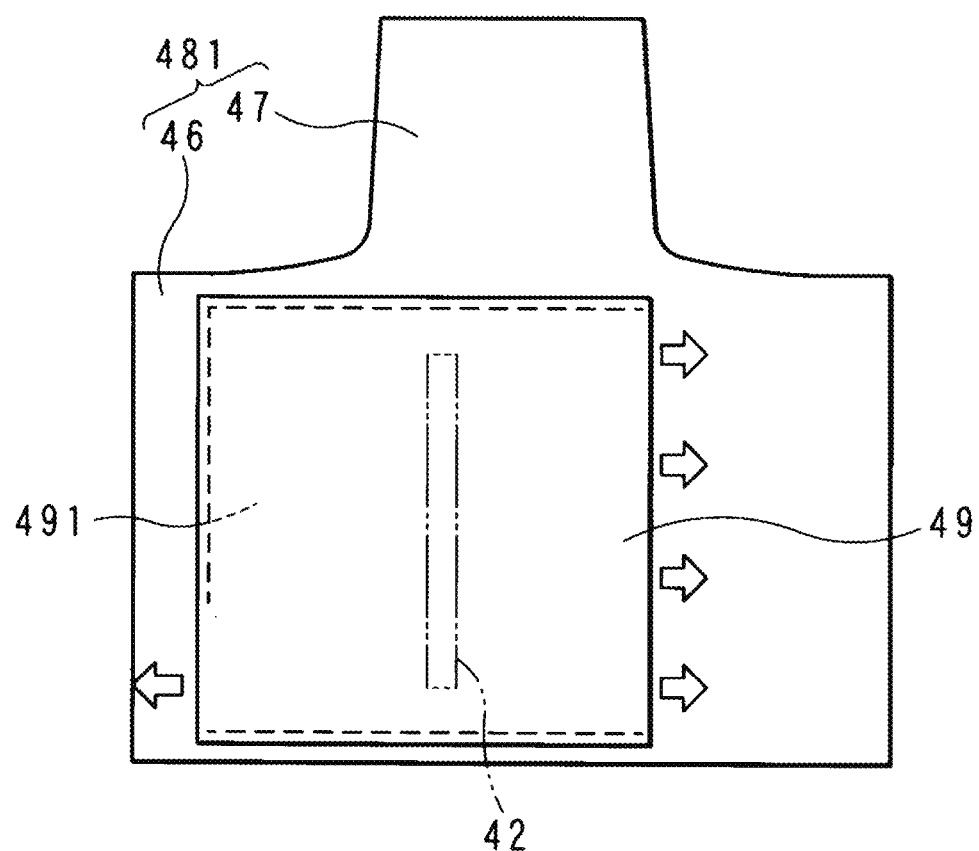
FIG. 14 is an explanatory diagram for describing a method of joining a first panel and rectifying sheet according to embodiment 3.

FIG. 14 is an explanatory diagram illustrating a method for joining the first panel 481 and the rectifying sheet 49 according to embodiment 3. The rectifying sheet 49 is fixed to the first panel 481 along two sides parallel to the long side of the horizontal formed portion 46 and an upper portion of one side close to the short side of the horizontal formed portion 46. In other words, in the present embodiment, the diffuser 491 is formed with openings at two horizontal positions, capable of ejecting the gas discharged from the inflator 42 in the horizontal direction of the vehicle 100.

In other words, the diffuser 491 of the present embodiment is open for a portion in the vertical direction at one end in the horizontal direction of the vehicle 100 (end on the driver seat 2 side), open along the entire length in the vertical direction on the other end in the horizontal direction (end on the passenger seat 3 side), and closed over the entire length in the upper and downward directions of the vehicle 100.

With the present embodiment, during the process of deploying the cushion 41, the gas released from the inflator 42 causes the lower side on the passenger seat 3 side and the lower side on the driver seat 2 side to deploy first. Thereby, an airbag device 4 that can prioritize protecting the abdomen of the passenger sitting on the driver seat 2 from the initial stage of deployment can be provided. At the same time, this enables starting protection for the passenger seated in the passenger seat 3 at an early stage.

Note that the rectifying sheet 49 can be fixed to the first panel 481 along two sides parallel to the long side of the horizontal formed portion 46 and an upper portion of one side separated from the short side of the horizontal formed portion 46. The rectifying sheet 49 can also be fixed to the first panel 481 along two sides parallel to the long side of the horizontal formed portion 46 and a lower portion of one side close to the short side of the horizontal formed portion 46. The rectifying sheet 49 can also be fixed to the first panel 481 along two sides parallel to the long side of the horizontal formed portion 46 along a portion excluding a central portion of one side separated from the short side of the horizontal formed portion 46.

Embodiment 4

Figure 15:
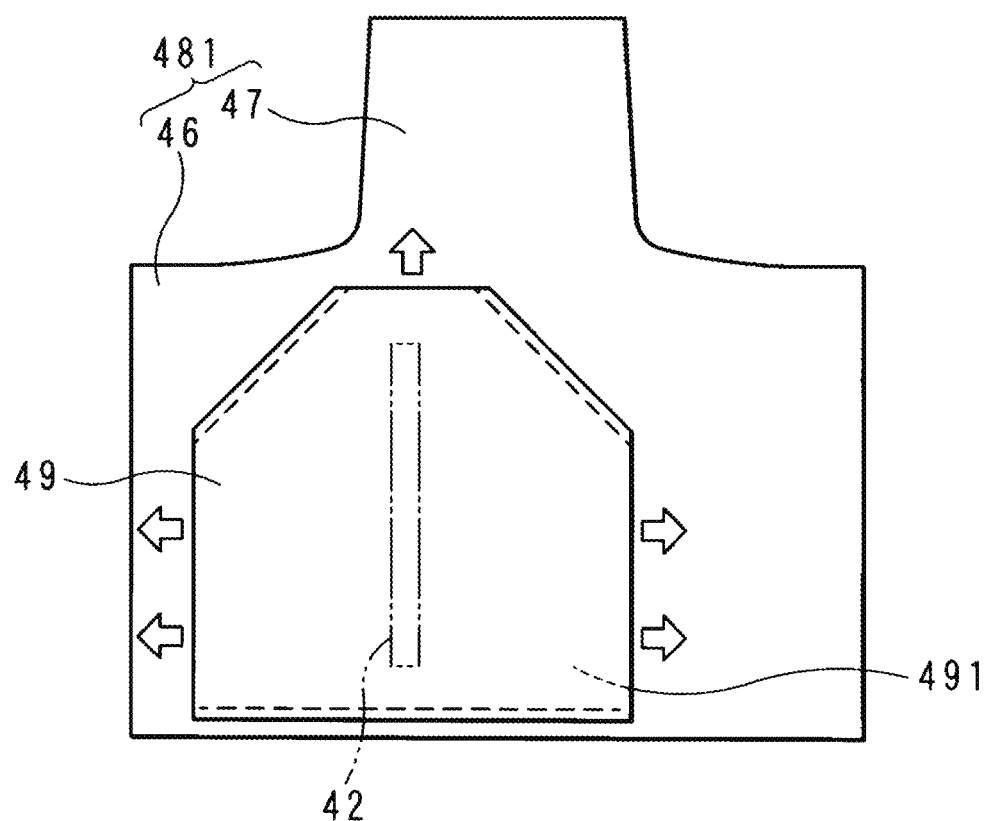
FIG. 15 is an explanatory diagram for describing a method of joining a first panel and rectifying sheet according to embodiment 4.

The present embodiment is related to an airbag device 4 having a polygonal shape (hexagonal in this case) rectifying sheet 49. Descriptions of parts common to embodiment 1 will be omitted. FIG. 15 is an explanatory diagram illustrating a method of joining the first panel 481 and the rectifying sheet 49 in embodiment 4. The rectifying sheet 49 is fixed to the first panel 481 along two oblique sides and one side that is not adjacent to the oblique sides.

In other words, with the present embodiment, the diffuser 491 openings through which the gas discharged from the inflator 42 can be ejected are formed at a total of three locations, in the upward direction, and at both ends in the horizontal direction of the vehicle 100. In other words, the gas discharged from the inflator 42 flows out from the diffuser 491 in three directions.

With the present embodiment, during the process of deploying the cushion 41, the portion protruding in the upward direction of the vehicle 100 and that is close to the driver seat 2 and close to the inflator 42 deploys first, followed by the portion that deploys towards the head of the passenger seated in the passenger seat 3. Therefore, when the cushion 41 is being deployed, the head of the passenger in the driver seat 2 can be protected from the initial stage of deployment, and the head of the passenger seated in the passenger seat 3 can be protected at an early stage.

Embodiment 5

The present embodiment relates to an airbag device 4 in which the rectifying sheet 49 is fixed to the first panel 481 on two upper and lower sides and has an opening on a portion of the upper side. Descriptions of parts common to embodiment 1 will be omitted.

Figure 16:
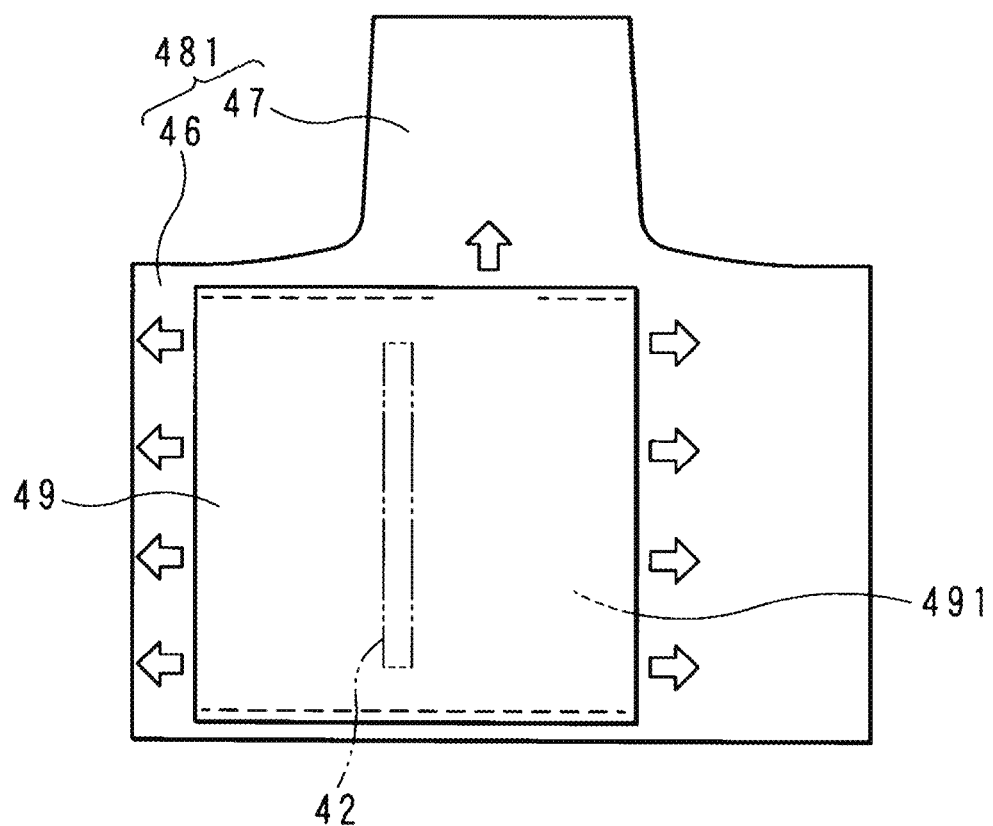
FIG. 16 is an explanatory diagram for describing a method of joining a first panel and rectifying sheet according to embodiment 5.

FIG. 16 is an explanatory diagram illustrating a method for joining the first panel 481 and the rectifying sheet 49 in embodiment 5. The rectifying sheet 49 is fixed to the first panel 481 on a side closer to the protruding formed portion 47 of the two sides parallel to the long side of the horizontal formed portion 46, or in other words, the upper side, excluding a portion. The other side, or in other words, the lower side, is fixed to the first panel 481 along the entire length. A portion of the long side on the side of the protrusion formed portion 47 is open. In other words, with the present embodiment, a diffuser 491 is formed that is open along the entire length on both ends in the horizontal direction of the vehicle 100, partially open with a remaining portion closed in the upward direction of the vehicle 100, and closed along the entire length in the downward direction.

With the present embodiment, during the process of deploying the cushion 41, a portion of the gas released from the inflator 42 quickly deploys the protruding portion 41e. By appropriately selecting the length of the opening on the upper side of the rectifying sheet 49, the deployment speed of the protruding portion 41e can be set appropriately. Therefore, an airbag device 4 that can appropriately protect the upper body and the head of the passenger seated in the driver seat 2 and the passenger seat 3 can be provided.

Embodiment 6

The present embodiment relates to an airbag device 4 that uses an independent tube-shaped diffuser 494 inside a cushion instead of the rectifying sheet 49. Descriptions of parts common to embodiment 1 will be omitted.

Figure 17:
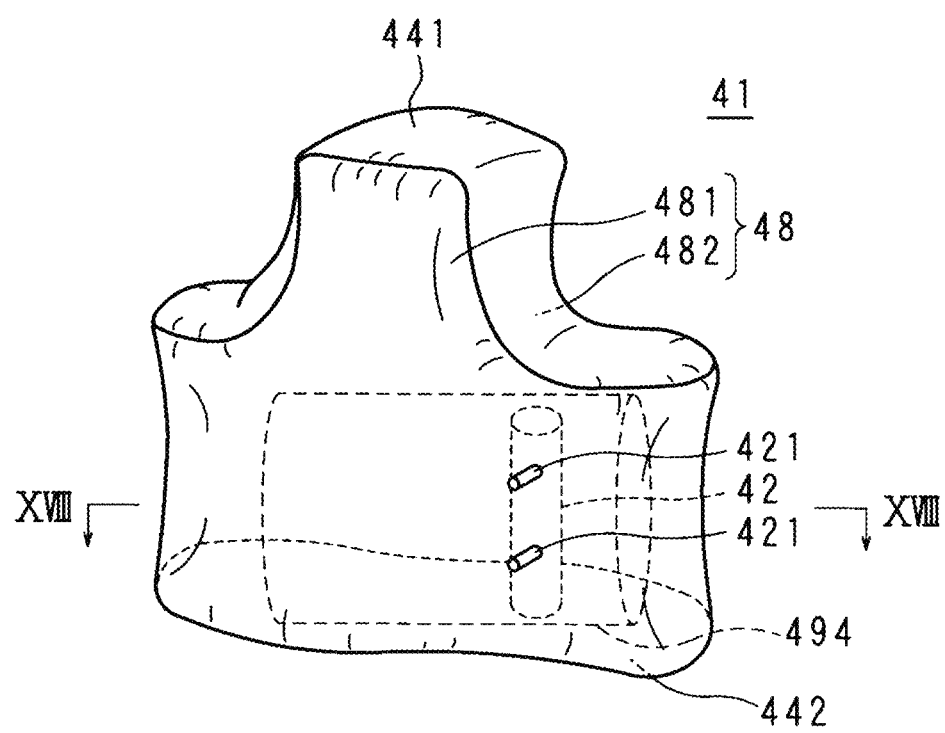
FIG. 17 is a perspective view illustrating an example of a cushion according to embodiment 6.
Figure 18:
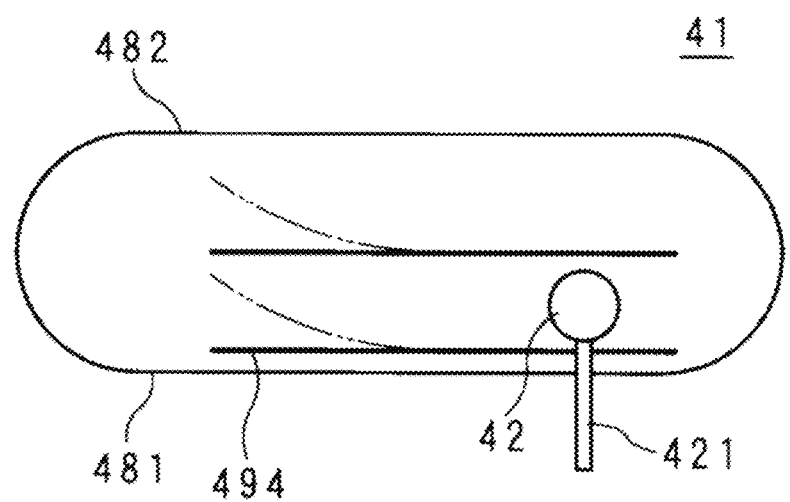
FIG. 18 is a cross-sectional view taken along line XVIII-XVIII in FIG. 17.

FIG. 17 is a perspective view illustrating an example of the cushion 41 of embodiment 6. FIG. 18 is a cross-sectional view along line XVIII-XVIII in FIG. 17. The directions illustrated in FIG. 17 and FIG. 18 indicate the directions in the vehicle 100.

FIG. 17 and FIG. 18 show the cushion 41 when deployed. The independent tube-shaped diffuser 494 is provided inside the cushion 41 with an opening portion facing the front-back direction. The inflator 42 is provided inside the diffuser 494. Two stud bolts 421 extending from the inflator 42 penetrate the hole provided in the diffuser 494 and the insertion hole 412 provided in the cushion 41, and protrude from the cushion 41.

The diffuser 494 is fixed at a prescribed position by the stud bolts 421. The diffuser 494 is not fixed to other members on the front side or the rear side of the inflator 42.

This embodiment enables an airbag device 4 to be provided in which the diffuser 494 can be deformed, for example, as illustrated by the two-dot dashed line in FIG. 18. When the airbag 41 is expanded and deployed, the gas discharged from the inflator 42 is ejected in an oblique direction when the cushion 41 unfolds, such that, for example, an airbag device 4 that protects the passenger seated in the passenger seat 3 even when the passenger is leaning slightly forward is provided.

With the present embodiment, the diffuser 494 and the first panel 481 are not necessarily bonded by means such as sewing, adhesion or welding, and therefore an airbag device 4 with easy assembly can be provided.

The technical features (constituent elements) described in the respective embodiments can be mutually combined, and by combining the embodiments thereof, new technical features can be formed. For example, in embodiment 6, the diffuser 494 has a horizontal length such that the horizontal end portion can reach the front passenger seat 3 in a state where the cushion 41 is deployed, in the same manner as the rectifying sheet 49 as described in embodiment 1. Therefore, the opening formed at the horizontal end portion of the diffuser 494 also reaches the passenger seat 3 when the cushion 41 is deployed. The same applies to the rectifying sheet 49 described in embodiment 2 to embodiment 5.

The embodiments presently disclosed are to be considered as examples for all points, and are not restrictive. It is intended that the scope of the present invention is not indicated by the abovementioned meaning, but by Scope of the Patent Claims, and includes all changes in the meaning and scope equivalent to the Scope of the Patent Claims.

REFERENCE NUMERALS

100: Vehicle
1: Passenger compartment
10: Floor
2: driver seat
21: Seat
22: Backrest
23: Skeleton frame
3: Passenger seat
4: Airbag device
40: Housing portion
41: Cushion
41a: First portion
41b: Second portion
41c: Third portion
41d: Horizontal portion
41e: Protruding portion
412: Insertion hole
42: Inflator
421: Stud bolt
43: Stud bolt
44: Cover plate
441: First gusset portion
442: Second gusset portion
45: tear seam
46: Horizontal forming portion
47: Protrusion forming portion
48: Panel
481: First panel
482: Second panel
49: Rectifying sheet
491: diffuser
492: First end portion
493: Second end portion
494: Independent Tube Diffuser (Diffuser)
5: Seat belt

The invention claimed is:

1. An airbag device that expands and deploys in a vehicle passenger compartment of a vehicle and restrains a passenger sitting in a first seat from a side, comprising:
   a cushion provided with a horizontal portion that deploys in a horizontal direction of the vehicle in an expanded and deployed state and a protruding portion that deploys in an upward direction of the vehicle from a center portion of the horizontal portion;
   a diffuser that is secured inside the cushion, open in the horizontal direction of the vehicle, closed in a downward direction of the vehicle, and partially or entirely closed in a direction toward the protruding portion; and
   an inflator secured to the first seat and provided inside the diffuser, that discharges gas for expansion and deployment.

2. The airbag device according to claim 1, wherein the diffuser at least partially opens in the horizontal direction of the vehicle.

3. The airbag device according to claim 2, wherein in a condition where the cushion is deployed, the diffuser has a horizontal length such that a first end portion in the horizontal direction is disposed in the first seat, and a second end portion in the horizontal direction can reach the a second seat adjacent to the first seat.

4. The airbag device according to claim 3, wherein the first seat is a driver seat, and the second seat is a passenger seat.

5. The airbag device according to claim 4, wherein the cushion has an insertion hole through which a stud bolt that secures the inflator to a structure in the vehicle cabin is inserted.

6. The airbag device according to claim 1, wherein the diffuser has a tube shape that is open over an entire length in a vertical direction at both ends of the vehicle in the horizontal direction, and closed over entire length in the upward direction and downward direction of the vehicle.

7. The airbag device according to claim 6, wherein in a condition where the cushion is deployed, the diffuser has a horizontal length such that a first end portion in the horizontal direction is disposed in the first seat, and a second end portion in the horizontal direction can reach the a second seat adjacent to the first seat.

8. The airbag device according to claim 7, wherein the first seat is a driver seat, and the second seat is a passenger seat.

9. The airbag device according to claim 8, wherein the cushion has an insertion hole through which a stud bolt that secures the inflator to a structure in the vehicle cabin is inserted.

10. The airbag device according to claim 1, wherein the diffuser has a bag shape having an opening through which the gas discharged from the inflator can be injected in the horizontal direction of the vehicle.

11. The airbag device according to claim 10, wherein the diffuser has a bag shape that is open over a portion or an entire length in the vertical direction at a first end in the horizontal direction of the vehicle, closed over the entire length in the vertical direction at a second end in the horizontal direction, and closed over the entire length in the upward direction and downward direction of the vehicle.

12. The airbag device according to claim 11, wherein in a condition where the cushion is deployed, the diffuser has a horizontal length such that a first end portion in the horizontal direction is disposed in the first seat, and a second end portion in the horizontal direction can reach the a second seat adjacent to the first seat.

13. The airbag device according to claim 12, wherein the first seat is a driver seat, and the second seat is a passenger seat.

14. The airbag device according to claim 13, wherein the cushion has an insertion hole through which a stud bolt that secures the inflator to a structure in the vehicle passenger compartment is inserted.

15. The airbag device according to claim 1, wherein the diffuser opens at three points, on both ends in the horizontal direction, and in the upward direction.

16. The airbag device according to claim 15 wherein in a condition where the cushion is deployed, the diffuser has a horizontal length such that a first end portion in the horizontal direction is disposed in the first seat, and a second end portion in the horizontal direction can reach the a second seat adjacent to the first seat.

17. The airbag device according to claim 16, wherein the first seat is a driver seat, and the second seat is a passenger seat.

18. The airbag device according to claim 17, wherein the cushion has an insertion hole through which a stud bolt that secures the inflator to a structure in the vehicle passenger compartment is inserted.

19. The airbag device according to claim 1 wherein in a condition where the cushion is deployed, the diffuser has a horizontal length such that a first end portion in the horizontal direction is disposed in the first seat, and a second end portion in the horizontal direction can reach the a second seat adjacent to the first seat.

20. The airbag device according to claim 1, wherein the cushion has an insertion hole through which a stud bolt that secures the inflator to a structure in the vehicle passenger compartment is inserted.

* * * * *